United States Patent [19]

Suzuki

[11] Patent Number: 4,474,460

[45] Date of Patent: Oct. 2, 1984

[54] MICROFILM COPYING MACHINE

[75] Inventor: Kazuhiro Suzuki, Kanagawa, Japan

[73] Assignee: Fuji Xerox Company Limited, Tokyo, Japan

[21] Appl. No.: 396,949

[22] Filed: Jul. 9, 1982

[30] Foreign Application Priority Data

Jul. 16, 1981 [JP] Japan ................................ 56-111576
Sep. 11, 1981 [JP] Japan ................................ 56-143196

[51] Int. Cl.³ ................................ G03B 27/72
[52] U.S. Cl. ................................ 355/55; 355/69
[58] Field of Search ................................ 355/55, 56, 68, 71

[56] References Cited

U.S. PATENT DOCUMENTS 3,832,058 8/1974 Gusovius ................................ 355/56
3,898,676 8/1975 Hosoe et al. ................................ 355/55 X
4,125,323 11/1978 Ikeda et al. ................................ 355/71 X
4,212,531 7/1980 Shimomura ................................ 355/55
4,279,497 7/1981 Satomi ................................ 355/71 X

*Primary Examiner*—Richard A. Wintercorn
*Attorney, Agent, or Firm*—Sughrue, Mion, Zinn, Macpeak, and Seas

[57] ABSTRACT

A microfilm copying machine is provided with a variable width exposure slit controlled by a magnification setting, for decreasing the range of the light output quantity required of the light source. The device may also include a mechanism by which the exposure is varied in response to changes in magnification factor, the density of a film and variations in the quantity of light which reaches the photo-sensitive drum or like device.

8 Claims, 2 Drawing Figures

MICROFILM COPYING MACHINE

BACKGROUND OF THE INVENTION

This invention relates to exposure adjusting devices, and more particularly to an exposure adjusting devive for a microfilm copying machine.

In general, a microfilm copying machine copies an enlarged image of a microfilm. There are two types of microfilm copying machines: one in which the image of the microfilm is copied at a predetermined magnification only, and another in which the image of the microfilm may be copied at different magnifications. In the former copying machine, the quantity of light output by the exposure lamp may be constant; however, in the latter copying machine the quantity of light must be adjusted according to the selected magnification, so as to obtain a correct exposure value.

Furthermore, in a conventional microfilm copying machine, there are variations in the exposure of a photo-sensitive body which are caused by a change in the light quantity due to the soiled condition inside the copying machine, variations of the intensity or quantity of transmitted light due to a change of the film density, etc. These variations are troublesome in the conventional copying machine.

In a conventional microfilm copying machine, the quantity of light is controlled by merely manually adjusting the quantity of light emitted by the exposure lamp. Accordingly, if the variation range of the enlargement magnification is large, the quantity of light must be adjusted over a wide range, and accordingly, the wavelength of the light emitted by the exposure lamp is also greatly changed. As a result, light of wavelengths deviating from the inherent sensitivity range of the body or drum is received by the body or drum, adversely effecting the copying operation.

Furthermore, the conventional microfilm copying machine has no means for automatically correcting the variation of the exposure due to soiled conditions inside the copying machine such as for instance a soiled lens system, and requires manual adjustment when the intensity of the light source is changed due to the replacement of the exposure lamp.

SUMMARY OF THE INVENTION

Accordingly, this invention combines the adjustment of the quantity of light emitted by an exposure lamp with the adjustment of the width of a slit, to thereby provide a correct exposure for a photo-sensitive body or drum even when the enlargement magnification is changed over a wide range.

The foregoing object of the invention is achieved by the provision of an exposure adjusting device for use in a copying machine including an exposure lamp, a slit arranged adjacent to a photo-sensitive drum and a magnification setting unit for setting an enlargement magnification; in which, according to the invention, the slit is variable in width, and a control unit is provided which receives magnification data from the magnification setting unit to adjust the voltage of the exposure lamp and the width of the slit according to the magnification data. That is, the invention is intended to combine the adjustment of the quantity of light emitted by the exposure lamp and the adjustment of the width of the slit, to thereby adjust the quantity of light reaching the photo-sensitive drum. Accordingly, even if the lamp voltage adjustment range is made smaller than that in the conventional microfilm copying machine, in which only the quantity of light from the exposure lamp is adjusted, the same effect may be obtained, and accordingly the effect of the wavelength variation of the emitted light can be reduced.

Further, the invention is intended to provide a microfilm copying machine which includes a first light quantity detector arranged adjacent to a photo-sensitive body, namely, a photo-sensitive drum, for detecting the quantity of light applied through the optical system of the copying machine to the photo-sensitive body; a second light quantity detector arranged adjacent to a photo-sensitive body, for detecting the quantity of light applied to the photo-sensitive drum when a microfilm to be copied is set in the optical system; a magnification setting unit for setting the magnification of the image of the film to be copied; a lamp voltage control circuit for controlling the voltage applied to the light source, namely, a lamp, to change the intensity of the lamp; and a control device including a microcomputer for performing calculations according to the difference between the light quantities applied to the photo-sensitive body, which are detected by the first and second light quantity detectors, to control the lamp voltage control circuit, so that the density of the resultant copy is constant at all times irrespective of the performance of the optical system of the copying machine and the density of the microfilm to be copied.

DETAILED DESCRIPTION OF THE PREFERRED EMBODIMENTS

Figure 1:
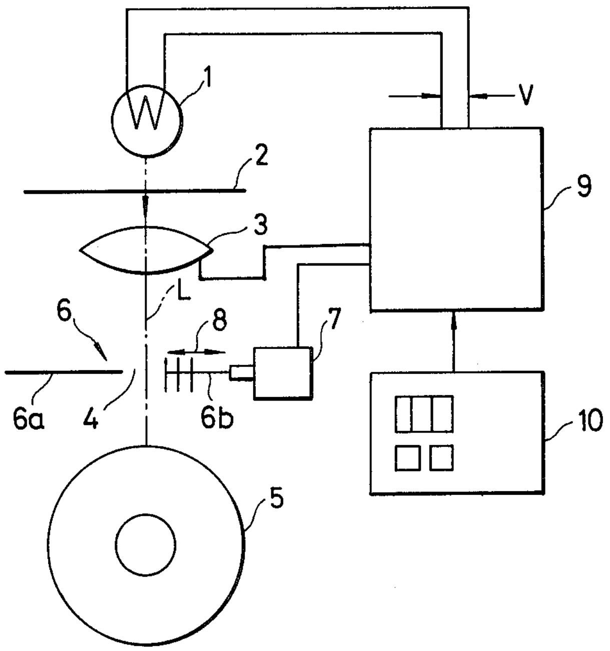
FIG. 1 is a schematic diagram, partly as a block diagram, of a first embodiment of a microfilm copying device according to the invention.

A first embodiment of the invention will be described with reference to the accompanying drawings. In FIG. 1, an exposure lamp 1 is provided for illuminating a microfilm 2. Light from the lamp 1 passes through the microfilm 2, and the image of the microfilm is formed on a photo-sensitive drum 5 through a slit 4 by a projecting lens 3. In the optical path, an enlarging lens is also disposed; however, it is not shown for simplification in illustration.

The slit 4 is formed by a slit member 6. More specifically, the slit member 6 comprises two parts *6a* and *6b* which are arranged on either side of the slit 4, respectively. Part *6a* is stationary, while part *6b* is movable, so that the width of the slit 4 can be changed in steps. The movable part *6b* is coupled to a solenoid 7, and is moved horizontally (as indicated by the arrow 8) by the solenoid 7 to change the width of the slit 4. The operation of the solenoid 7 is controlled by a control unit 9, which also controls the voltage V of the exposure lamp 1. A magnification setting unit 10 applies a set magnification to the control unit 9.

An exposure control operation according to the invention will now be described. When the operator operates the magnification setting unit 10 to set the desired magnification, the magnification is read by the control unit 9. When the magnification is high, the control unit 9 operates the solenoid 7 to increase the width of the slit 4. On the other hand, when the magnification is low, the control unit operates the solenoid 7 to decrease the width of the slit 4. The control unit 9 calculates the voltage V for determining the quantity of light of the exposure lamp 1 from the enlargement magnification and the slit width, which have been selected as described above. For this calculation, a microcomputer is built in the control unit 9.

In the above-described embodiment, the width of the slit 4 is changed in two steps; however, the range of enlargement magnifications can be increased by increasing the number of steps by which the slit width may be changed. Furthermore, in the above-described embodiment, the control unit comprises a microcomputer; however, this may be replaced by any means which can control the slit width and the lamp voltage according to a selected magnification.

As is apparent from the above description, according to the invention, not only the quantity of light of the exposure lamp, but also the slit width is controlled, and therefore the light quantity emitted by the exposure lamp is less changed. For instance, in the case where the ratio of the slit width for the high magnification to the slit width for the low magnification is 2:1, the variation in the quantity of light irradiating the surface of the photo-sensitive drum is twice the variation in the quantity of light output by the exposure lamp. Accordingly, the adjustment range of the exposure lamp voltage can be reduced, and the effect of the wavelength variation of the emitted light with respect to the sensitivity of the photo-sensitive drum can be reduced.

Figure 2:
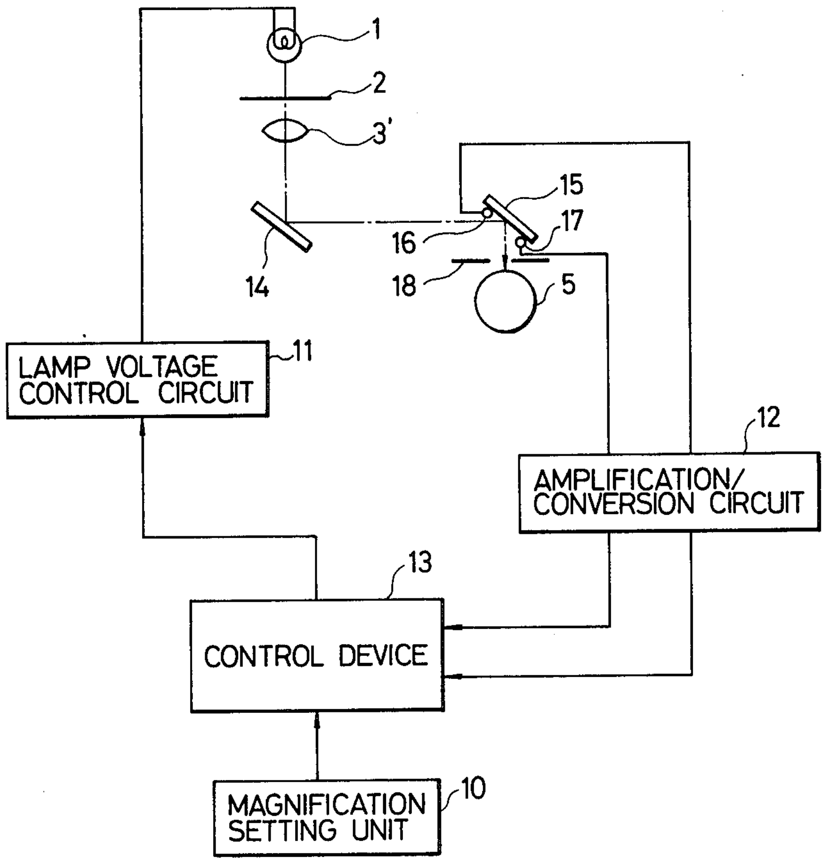
FIG. 2 is a schematic diagram, partly as a block diagram, of a second embodiment.

A second embodiment of the invention is as shown in FIG. 2.

Light from a light source or lamp 1 is applied through a film 2, a zoom lens 3′, a first mirror 14, a second mirror 15 and a slit 18 to a photo-sensitive body (or a photo-sensitive drum) 5. First and second photo-sensors 16 and 17 are provided on the second mirror, which is disposed adjacent to the photo-sensitive body 5. The first photo-sensor 16 detects the quantity of light reaching the photo-sensitive body through the optical system. This detection is carried out before the film 2 is loaded in the copying machine, and the detection value is stored in a control device 13. The second photo-sensor 17 detects the quantity of light which reaches the photo-sensitive body through the optical system and the film 2. Therefore, this detection is carried out after the film 2 has been loaded in the copying machine. The control device 13 obtains the difference between the detection values outputted by the first and second photo-sensors, to obtain the optical transmission density of the film 2 loaded in the copying machine. The outputs of the first and second photo-sensors 16 and 17 are amplified and converted into digital data by an amplification/conversion circuit 12, and the digital data are applied to the control device.

The control device 13 includes a microcomputer which operates to store the detection values outputted by the photo-sensors, to calculate the correct exposure, and to specify the lamp voltage.

The control device 13 obtains a value indicative of the variation of the quantity of light emitted by the light source, which is due to the soiled conditions inside of the copying machine or to the replacement of the lamp, from the difference between the detection value of the first photo-sensor 16 and a reference value. The variation thus obtained is stored in a memory device incorporated in the control device 13. In this operation, the film is not yet loaded in the copying machine.

When the film 2 is loaded in the copying machine, the detection value of the second photo-sensor 17 is applied to the control device 13, so that the optical transmission density of the loaded film 2 can be obtained from the difference between the detection values of the first photo-sensor 16 and the second photo-sensor 17. The control device 13 calculates a correct lamp voltage from the aforementioned detected quantity of light from the light source, the optical transmission density of the film and data from the magnification setting unit 10, and converts the lamp voltage thus calculated into a digital value, which is applied to a lamp voltage control circuit 11. The above-described calculation is carried out by the microcomputer. Since all calculations are carried out with digital values, the calculation results are high in accuracy.

In the lamp voltage control circuit 11, the digital value from the control device 13 is converted into a lamp voltage to control the light quantity of the lamp.

In the above-described embodiment, the voltage of the lamp is controlled to adjust the exposure; however, the exposure may be adjusted using a diaphragm. Furthermore, in the above-described embodiment, first and second photo-sensors are employed; however, they may be replaced by a single photo-sensor.

With the microfilm copying device according to the invention, the exposure is automatically adjusted even when the quantity of light from the light source is changed due to the replacement of the lamp. Therefore, maintenance can be readily achieved, and deterioration due to the soiled conditions inside the copying machine, which affects the density of the copy and which may last for a long time, can be corrected automatically. Even if the films to be copied are of variable density, it is unnecessary to manually adjust the copying density for every film. Thus, the operability of the microfilm copying machine is remarkably improved according to the invention.

What is claimed is:

1. An exposure adjusting device for use in a copying machine including an exposure lamp, a slit arranged adjacent to a photo-sensitive drum and a magnification setting unit for setting an enlargement magnification, comprising; means for varying the width of said slit, and control means receiving magnification data from said magnification setting unit, for controlling said slit width varying means according to said magnification setting, and for controlling the output illumination of said exposure lamp in accordance with the slit width and said magnification data.

2. A copying apparatus, comprising;

first light quantity detecting means for detecting a quantity of light applied to a photo-sensitive body through an optical system;

second light quantity detecting means for detecting a quantity of light applied to said photo-sensitive body through a film plus said optical system;

magnification setting means for setting a copy magnification;

lamp control means for controlling a lamp adapted to expose said photo-sensitive body; and control means for controlling said lamp control means according to the difference between quantities of light detecting by said first and second light quantity detecting means and a magnification value set by said magnification setting means, to thereby maintain substantially constant a copy density of the copying apparatus.

3. An apparatus as claimed in claim 1, said control means comprising a microcomputer for calculating a voltage for determining said output illumination of said exposure lamp.

4. An apparatus as claimed in claim 1, said slit width varying means comprising solenoid means controlled by said control means and connected to a movable portion of said slit.

5. An apparatus as claimed in claim 2, said first and second light quantity detecting means comprising a single photo-detector arranged on a side of said optical system proximate said photo-sensitive body.

6. An apparatus as claimed in claim 2, said control means comprising microcomputer means for calculating a lamp voltage according to at least a density of said film and said magnification value.

7. An apparatus as claimed in claim 6, said microcomputer means including means for comparing an output of said first light quantity detecting means with a reference value, to compensate said lamp voltage for changes in the quantity of light passing through said optical system.

8. An apparatus as claimed in claim 4, said slit width being stepwisely variable.

* * * * *